(12) United States Patent
Genece et al.

(10) Patent No.: US 11,654,785 B2
(45) Date of Patent: May 23, 2023

(54) VEHICLE CHARGE PORT

(71) Applicant: FORD GLOBAL TECHNOLOGIES, LLC, Dearborn, MI (US)

(72) Inventors: Isaiah Genece, Detroit, MI (US); Darko Acevski, Sterling Heights, MI (US); William Christopher Trego, Royal Oak, MI (US); Douglas G Hughes, Ypsilanti, MI (US); Zubair Hassan, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 233 days.

(21) Appl. No.: 16/907,602

(22) Filed: Jun. 22, 2020

(65) Prior Publication Data

US 2021/0394626 A1 Dec. 23, 2021

(51) Int. Cl.
| | | |
|---|---|---|
| *H01R 13/52* | (2006.01) | |
| *H01R 13/502* | (2006.01) | |
| *H01R 13/405* | (2006.01) | |
| *B60L 53/16* | (2019.01) | |
| *H02J 7/00* | (2006.01) | |
| *H02J 7/02* | (2016.01) | |
| *B60K 6/28* | (2007.10) | |

(52) U.S. Cl.
CPC ............ *B60L 53/16* (2019.02); *H01R 13/405* (2013.01); *H01R 13/502* (2013.01); *H01R 13/521* (2013.01); *H02J 7/0045* (2013.01); *H02J 7/02* (2013.01); *B60K 6/28* (2013.01); *B60Y 2200/91* (2013.01); *B60Y 2200/92* (2013.01); *B60Y 2300/91* (2013.01)

(58) Field of Classification Search
CPC ..... B60L 53/16; H01R 13/405; H01R 13/502; H01R 13/521; H01R 13/5202; H01R 13/5205; H01R 13/5213; H01R 13/5221; H02J 7/0045; H02J 7/02; B60K 6/28; B60Y 2200/91; B60Y 2200/92
See application file for complete search history.

(56) References Cited

U.S. PATENT DOCUMENTS

| | | | | |
|---|---|---|---|---|
| 9,463,702 | B2* | 10/2016 | Fukushima | ............. B60L 53/16 |
| 9,601,864 | B2 | 3/2017 | Schmidt | |
| 10,106,109 | B2* | 10/2018 | Kawai | ...................... B60L 53/16 |
| 10,243,298 | B2* | 3/2019 | Kawai | ...................... H01R 12/65 |
| 10,290,969 | B2 | 5/2019 | Zhu et al. | |
| 2013/0224969 | A1* | 8/2013 | Sasaki | ..................... H01R 31/06 439/34 |
| 2015/0258905 | A1* | 9/2015 | Fukushima | ............. B60L 53/16 439/34 |
| 2015/0364877 | A1* | 12/2015 | Osawa | ................... H01R 13/42 439/34 |
| 2018/0345804 | A1* | 12/2018 | Nagel | ..................... H05B 3/18 |

OTHER PUBLICATIONS

US 10,205,251 B2, 02/2019, Morita et al. (withdrawn)

\* cited by examiner

*Primary Examiner* — Edwin A. Leon
(74) *Attorney, Agent, or Firm* — David B Kelley; Brooks Kushman P.C.

(57) ABSTRACT

A vehicle charge port assembly includes a housing having a port configured to couple to a charge-station coupler. The port includes a plurality of terminals and a back cover attached to a back side of the housing and defining openings that receive the terminals. The port further includes wires, each joined to one of the terminals, and seals each encircling one of the wires and disposed in a corresponding one of the openings.

6 Claims, 4 Drawing Sheets

VEHICLE CHARGE PORT

TECHNICAL FIELD

This disclosure relates to charge ports used to couple an electric vehicle to a charging station, and more particularly to internal connections between components within the charge port.

BACKGROUND

An electrified powertrain may include an engine and an electric machine. The torque (or power) produced by the engine and/or the electric machine can be transferred through a transmission to the driven wheels to propel the vehicle. A traction battery supplies energy to the electric machine. The vehicle may include a charge port configured to receive power from a charging station.

SUMMARY

According to one embodiment, a vehicle charge port assembly includes a housing having a port configured to couple to a charge-station coupler. The port includes a plurality of terminals and a back cover attached to a back side of the housing and defining openings that receive the terminals. The port further includes wires, each joined to one of the terminals, and seals each encircling one of the wires and disposed in a corresponding one of the openings.

According to another embodiment, a vehicle charge port assembly includes a housing having a front side defining a port configured to couple to a charge-station coupler, a back side, and a plurality of terminal receptacles extending from the port to the back side. A plurality of terminal assemblies are received in the terminal receptacles. Each of the terminal assemblies includes a pin having a tip portion configured to electrically connect to the coupler, a base portion, a busbar connected to the base portion and extending out of the back side, and a seal encircling the pin and sealingly disposed within the terminal receptacles. A back cover is attached to the back side of the housing and has a connector base defining an opening and interior that receives the busbars therein. A connector plug is configured to connect to the connector base. The plug includes a plurality of receptacles extendable into the interior and configured to receive the busbars therein, wires that are each joined to one of the receptacles, a plurality of seals each defining a single hole that receives only one of the wires therethrough, and a plurality of seal covers that each secure an associated one of the seals within the plug.

According to yet another embodiment, a vehicle charge port assembly includes a housing having a port configured to couple to a charge-station coupler. The port has a plurality of alternating-current (AC) terminal assemblies each including a proximal end configured to couple to the coupler and a distal end projecting from a back side of the housing. A back cover is attached to the back side of the housing and includes a connector base defining an opening and interior that receives the distal ends therein. An AC plug is configured to connect to the connector base. The plug includes a plurality wires that are each associated with one of the terminal assemblies and a plurality of seals each defining a single hole that receives only one of the wires therethrough.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
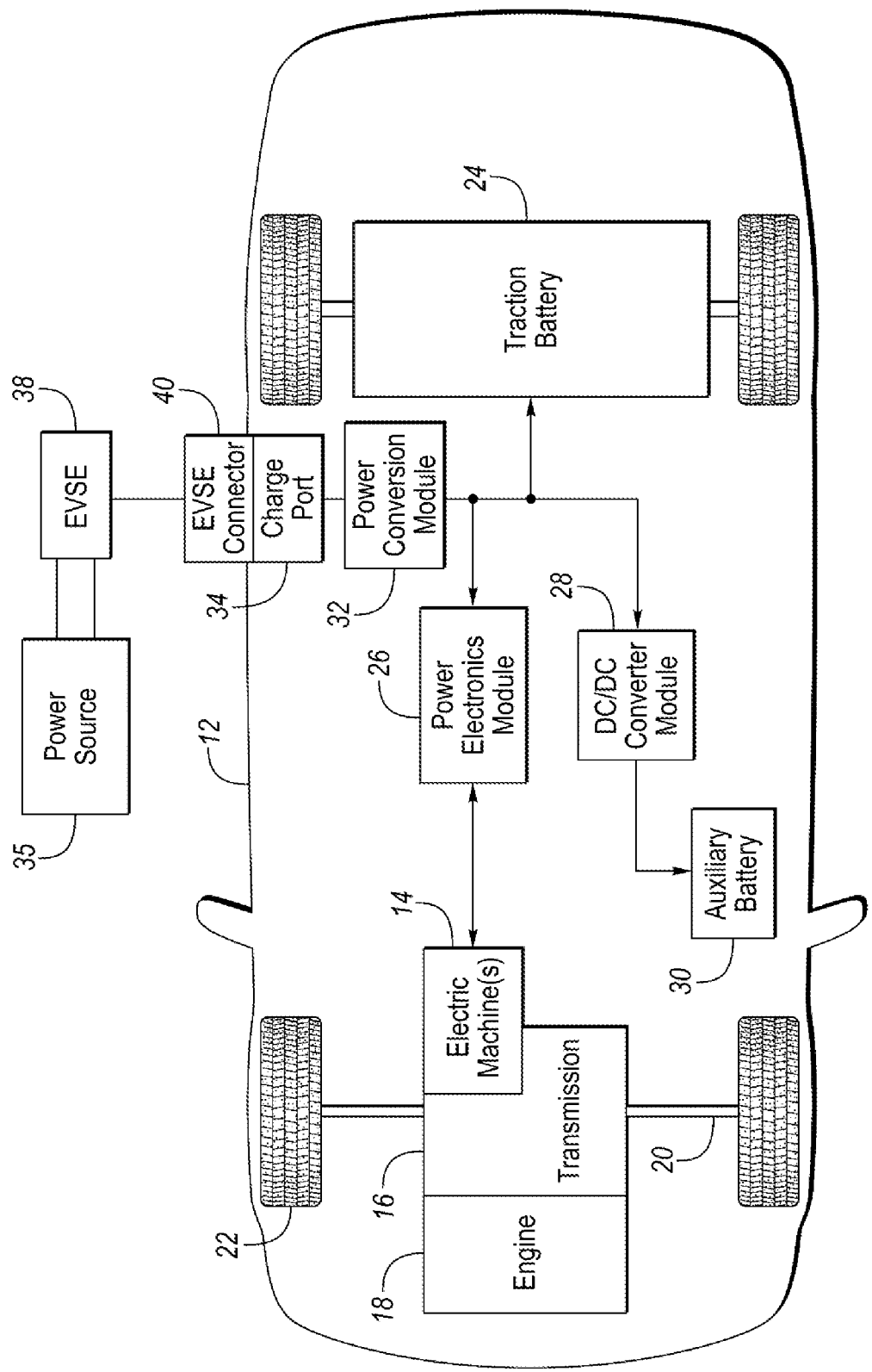
FIG. 1 is a diagram of a plug-in hybrid-electric vehicle illustrating drivetrain and energy storage components.

FIG. 1 depicts a typical plug-in hybrid-electric vehicle (HEV). A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an engine 18. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also provide reduced pollutant emissions since the hybrid-electric vehicle 12 may be operated in electric mode under certain conditions.

A traction battery or battery pack 24 stores energy that can be used by the electric machines 14. A vehicle battery pack 24 typically provides a high voltage DC output. The battery pack 24 is electrically connected to one or more power electronics modules 26. The power electronics module 26 is also electrically connected to the electric machines 14 and provides the ability to bi-directionally transfer energy between the battery pack 24 and the electric machines 14. For example, a typical battery pack 24 may provide a DC voltage while the electric machines 14 may require a three-phase AC current to function. The power electronics module 26 may convert the DC voltage to a three-phase AC current as required by the electric machines 14. In a regenerative mode, the power electronics module 26 may convert the three-phase AC current from the electric machines 14 acting as generators to the DC voltage required by the battery pack 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the battery pack 24 may provide energy for other vehicle electrical systems. A typical system may include a DC/DC converter module 28 that converts the high voltage DC output of the battery pack 24 to a low voltage DC supply that is compatible with other vehicle loads. Other high-voltage loads, such as compressors and electric heaters, may be connected directly to the high-voltage without the use of a DC/DC converter module 28. In a typical vehicle, the low-voltage systems are electrically connected to an auxiliary 12V battery 30.

The vehicle 12 may be an electric vehicle or a plug-in hybrid vehicle in which the battery pack 24 may be recharged by an external power source 35. The external power source 35 may be a connection to an electrical outlet. The external power source 35 may be electrically connected to electric vehicle supply equipment (EVSE) 38. The EVSE 38 may provide circuitry and controls to regulate and manage the transfer of energy between the power source 35 and the vehicle 12. The external power source 35 may provide DC or AC electric power to the EVSE 38. The EVSE 38 may have a charge coupler 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module may condition the power supplied from the EVSE 38 to provide the proper voltage and current levels to the battery pack 24. The power conversion module 32 may interface with the EVSE 38 to coordinate the delivery of power to the vehicle. The EVSE coupler 40 may have pins that mate with corresponding pins of the charge port 34.

The EVSE 38 may be designed to provide AC or DC power to the vehicle 12. Differences in the coupler 40 and charging protocol may exist between an AC and a DC capable EVSE 38. Provision of DC power may require different safety measures than an AC connection. An EVSE 38 may also be designed to provide both types of power. The EVSE 38 may be capable of providing different levels of AC or DC voltage.

The various components discussed may have one or more associated controllers to control and monitor the operation of the components. The controllers may communicate via a serial bus (e.g., Controller Area Network (CAN)) or via discrete conductors.

The EVSE 38 and the charge port 34 may be according to an industry standard, such as SAE J1772. The charge port 34 may only include AC or DC pins, or be a combination port having both AC and DC pins. The CCS Combo 2 is an example configuration of combination charge port. It includes AC pins according to SAE J1772 and two additional DC pins configured for DC fast charge.

Figure 2:
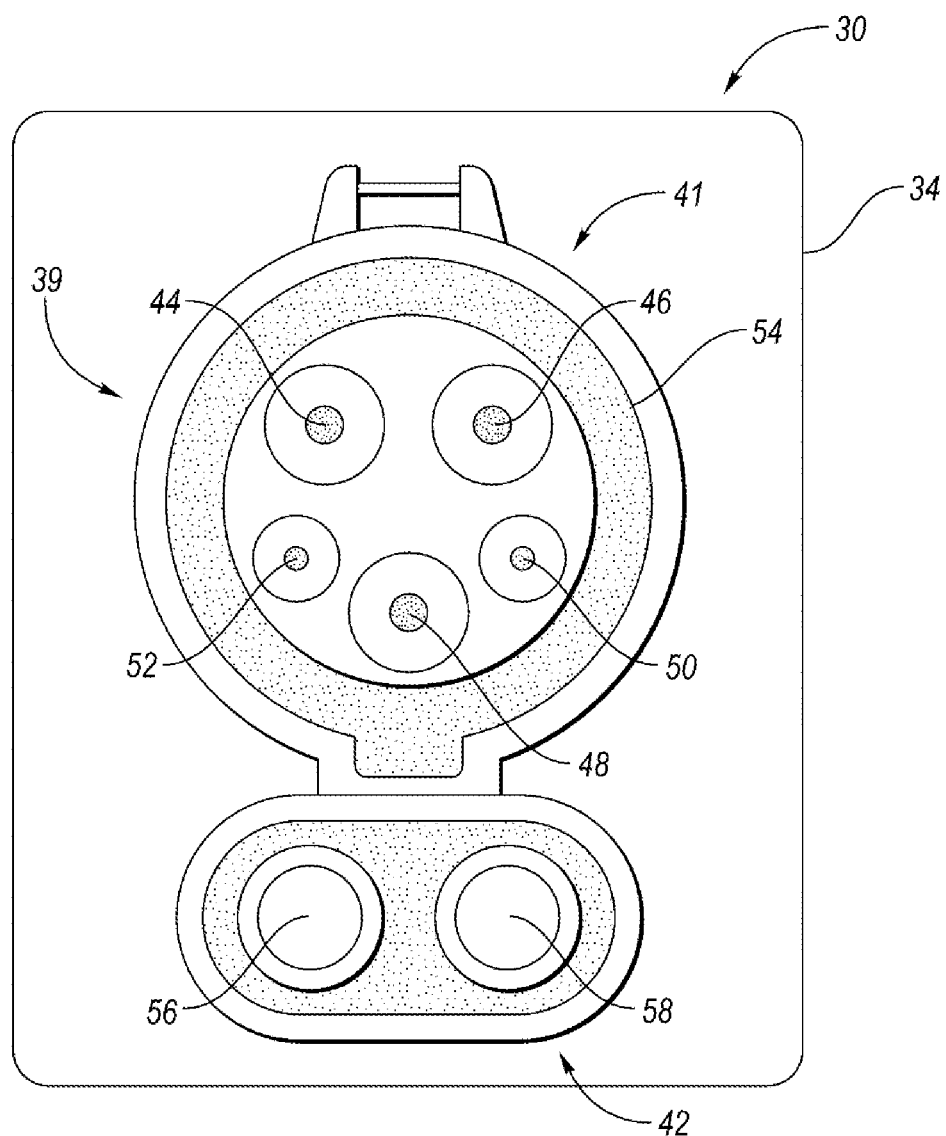
FIG. 2 is a front view of an example vehicle charge port according to one or more embodiments.

FIG. 2 illustrates a front view (exterior side) of the vehicle charge port 34. The charge port 34 includes a housing 36 that is supported on a body panel of the vehicle. The vehicle may include a flap or other covering that protects the charge port 34 from the elements when not in use. The charge port 34 includes a socket 39 configured to receive a coupler of the charging station. The illustrated socket 39 includes an AC connection 41 and a DC connection 42. The AC connection 41 may be according to standard SAE J1772 and includes a line pin 44, a line or common pin 46, a ground pin 48 a proximity pin 50, and a pilot pin 52. The pins 44 and 46 are for transferring the high-voltage power between the charging station the vehicle, and the pins 50 and 52 are used for communication and the like. Each of the pins may be disposed within a receptacle 54, e.g., a cylindrical opening, designed to receive a prong of the charge coupler 40. The DC connection 42 may include a pair of high-voltage DC pins 56 and 58. The pins may be male pins or female pins. The pins may also be referred to as terminals.

Each of these pins must be connected to a corresponding wire of one or more vehicle wiring harnesses so that electrical power and signals received at the port 34 are routed to the appropriate onboard modules of the vehicle. Directly connecting the wires to the pins is a tedious process and is not efficient for mass production. The following figures and related text disclose an improved vehicle charge port that simplifies the connection between the pins and the one or more wiring harnesses to increase manufacturing efficiencies and reduce defects.

Figure 3:
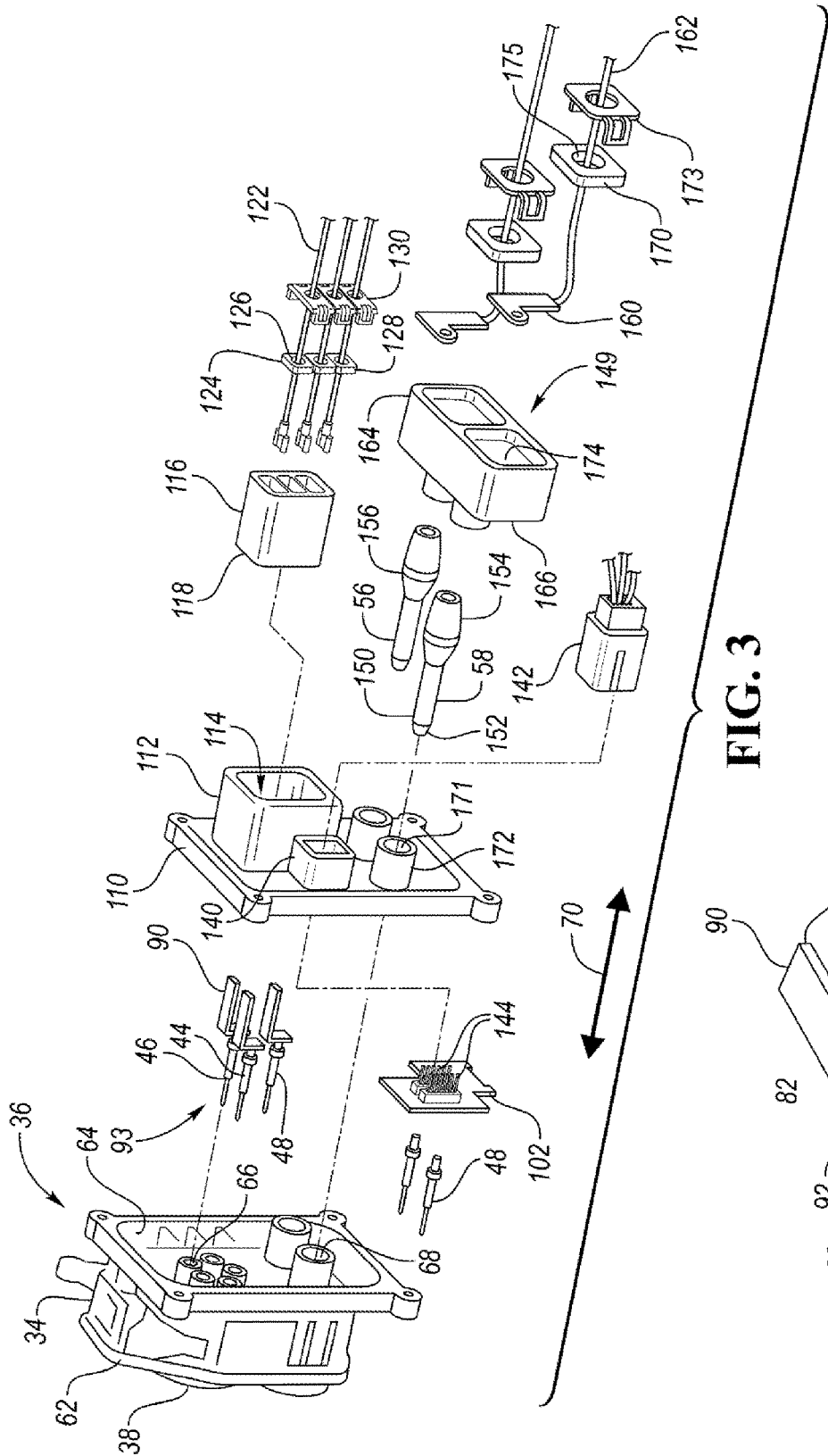
FIG. 3 is an exploded perspective view of a vehicle charge port assembly.

Referring to FIGS. 2 and 3, the housing 36 of the charge port 34 includes a front side 62 (exterior side) and a backside 64 (interior side). The socket 39 is formed on the front side 62. The housing 36 defines a plurality of openings 66 that receive the pins therein. The openings extend from the backside 64 to the front side 62. In the illustrated embodiment, the housing 36 defines seven openings, however, the number of openings will depend upon the number of pins which in other embodiments may only be five pins for an AC charge port or two pins for DC charge port. The openings 66 may be cylindrical and defined by a sidewall 68. The opening 66, while continuous from the front side to the backside, may have varying size, shape, diameter, etc. in the axial direction 70. For example, the opening 66 may have a larger diameter at the backside 64 that at the front side 62 to create a seat for the pins. The pins may be installed in the housing 36 from the backside 64.

Figure 4:
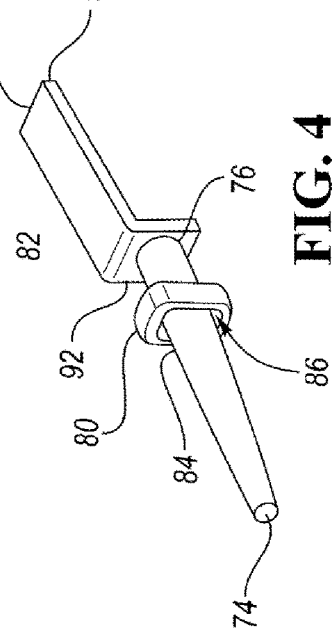
FIG. 4 is a perspective view of a pin assembly of the vehicle charge port assembly.

Referring to FIG. 4, a detail view of the AC pins 44, 46, and the ground pin 48 is shown according to one embodiment. Representative pin 44 is illustrated as a male pin having a slender cylindrical body 72 that is configured to be received in a corresponding female pin of the charge-station coupler. In other embodiments, however, the pin 44 may be a female pin. The body 72 includes a tip 74 forming a distal end of the pin and a base 76 forming a proximal end of the pin. The tip 74 is configured to engage with the corresponding mating pin of the coupler.

A seal 80 is received on each of the pins. That is, each of the pins has its own dedicated seal. The seal 80 is designed to sealingly engage between the pin and the opening 66 of the housing. The seal 80 may be annular having an outer circumferential surface 82 and an inner circumferential surface 84 that defines a central hole 86. The hole 86 has an inner diameter that approximates the diameter of the pin and an outer diameter that approximates the diameter of the opening 66. The inner diameter of the hole 86 may be slightly smaller than the diameter of the pin creating a snug fit when the pin is received through the hole 86, and the outer diameter of the seal 80 may be slightly larger than the diameter of the opening 66. While the seals 80 are shown as annular, the seals 80 may have different shapes in other embodiments. For example, the seals may have rectangular bodies.

Busbars 90 are connected to the pins 44, 46, 48. Each busbar 90 may be joined to the base 76 of the corresponding pin by welding, soldering, or the like. The busbars 90 may be flat strips of metal (sometimes called blade terminals) having a tab portion 92 that is joined to the pin and an end portion 94 configured to engage with a corresponding electrical receptacle. The busbars 90 may have any suitable shape such as straight, L-shaped, curved, angled, or the like. An assembled pin, seal, and busbar may be referred to as a pin assembly 93 or a terminal assembly.

Referring back to FIG. 3, the signal pins 50, 52 may also be male pins having a slender cylindrical body. The pins 50, 52 are smaller than the AC pins 44, 46 and the ground pin 48 as the pins 50, 52 are designed for low voltage. Each of the pins 50, 52 has a corresponding seal 96 that secures the pins 50, 52 in their respective openings 60. The seals 96 may be the same or similar to the above-described seals 80 except decreased in size to match the smaller pins and smaller openings. The pins 50, 52 have tip portions 98 configured to engage with the coupler and base portions 100 configured to mate with a printed circuit board 102.

The charge port 34 includes a rear cover 110 that is connected on the backside 64 of the housing 36. The rear cover 110 seals the charge port 34 and provides features for connecting the charge port 36, which may be packaged as a module, to one or more vehicle wiring harness. For example, the cover 110 may define a connector base 112 for the AC pins 44, 46 and the ground pin 48. The connector base 112 may project rearward from the cover 110 forming an internal cavity 114 that receives the pin assemblies 93 therein. The busbars 90 are arranged in the interior cavity 114 in a spaced apart arrangement so that they can be connected to corresponding receptacles. The connector base 112 is configured to connect to a connector plug 116 that is connected to one of the wiring harnesses of the vehicle. The plug 116 includes a plug body 118 that is configured to engage with the connector base 112. For example, the base 112 and the plug 116 may include features for securing these two halves together. The body 118 may define supports that secure terminals 120.

In the illustrated embodiment, the plug 116 includes three terminals to match with the three terminal assemblies 93. The terminals 120 may be female terminals (as shown) or male terminals when the terminal assemblies 93 include female terminals. Each of the terminals 120 are connected to a corresponding wire 122 of the wiring harness. The wires 122 and/or the terminals 120 are sealed on the backside of the plug body 118 by seals 124. The seals 124 define a hollow center 126 sized to receive a corresponding wire 122 therethrough. The seals 124 may be seated on the wire 122 or a rear portion of the terminals 120. The seals 124 also include an outer perimeter 128 configured to seal to the plug body 118. Each of the wires 122 may include a dedicated seal 124, which eases manufacturing. Each of the wires 122 may also include an associated seal cover 130. Thus, in the illustrated embodiment, the plug 116 includes three seal covers 130. Each seal cover 130 may define a hollow center configured to receive the wire therethrough and clips for attaching the seal covers 130 to the rear side of the body 118. Having dedicated seal covers 130 also eases manufacturing.

In some previous designs, the wires of the wiring harness were joined to the AC/ground pins directly through soldering or welding. This required the charge port to be assembled with the wiring harness as opposed to having a charge port module that can be fully formed and then plugged into the wiring harness. Assembling the charge port with the wiring harness has proven difficult as it required workers to thread the wires through multiple subassemblies, attach the wires to the pins, and then slide the multiple subassemblies back down the wire order to attach the rear cover to the front housing. This sometimes resulted in wire breakage in other unwanted defects. The above described connector connection between the charge port 34 and the plug 116 substantially improves manufacturability. In the designs of this disclosure, the charge port 34 can be fully formed as a module which is then connected to the wiring harness through a connector.

The rear cover 110 also defines a second connector base 140 configured to connect to another connector plug 142 associated with the pilot and proximity control circuits. The circuit board 102 includes prongs 144 that project into the cavity defined by the connector base 140. These prongs 144 engage with corresponding receptacles of the connector plug 142.

The charge port 34 has a DC subassembly 149 for the DC pins 56 and 58. Each of the DC pins 56, 58 includes a slender cylindrical body 150 including a tip 152 configured to engage a corresponding pin of the coupler and a base 154. The base may have a larger diameter than the tip. Similar to the other pins, each of the DC pins includes a dedicated seal 156 encircling the base 154 and configured to sealingly engage with the openings 66 of the housing 36. Busbars 160 are attached to the base is 154 of the DC pins 56, 58. The busbars 160 may be joined by fasteners or other joining means such as welding, soldering, clips, interference fit, or the like. The busbars 160 are attached to wires 162 of another wiring harness of the vehicle. The wires may be joined to the busbars 160 by soldering, welding, or other means.

An enclosure 164 is attached to the rear cover 112 over the DC pins 56, 58 and the busbars. The enclosure 164 may include a front side 166 having projections 167 defining openings (not visible) configured to receive the DC pins 56, 58 therein. The projections 167 may be cylindrical sleeves that project from the front side and are configured to connect with the DC openings 171 of the cover 110. The DC openings 171 may be defined by cylindrical sleeves 172 that project from the backside of the cover 110. The sleeves 172 and the projections 167 may telescopically connect. The enclosure 164 also defines an exit opening(s) 174 for the wires 162. The exit opening 174 may be closed by seals 170 and seal covers 173. Each of the wires 162 has a dedicated seal 170 and a dedicated seal cover 173. This facilitates assembly of the DC subassembly 149. The seals 170 may define a hollow center 175 configured to receive the wire 162 therethrough and a perimeter 176 that engages with the enclosure 164. The seal covers 173 also define a hollow center 178 at the wire 162 extends the. The seal covers 173 include features configured to engage with the enclosure 164 to secure the seals and the seal covers in place.

The DC subassembly 149 is not a true connector connection but is pluggable into an already formed charge port module. The DC subassembly 149 may be assembled to the charge port 34 by first inserting DC pins 56, 58 into the openings 171 of the back cover and through the corresponding openings 66 and the housing 36. Separately, the wires 162 are thread through the covers 173, the seals 170, and the enclosure 164. The wires 162 may then be joined to the busbars 160. The busbars 160 may then be attached to the bases 154 of DC pins, at which point, the enclosure 164 may be attached to the rear cover 110. The wires 162 may then be tensioned to remove excess slack within the enclosure 164. Once the wires 162 are properly positioned and the enclosure 164 is properly attached to the cover 110, the seals 170 are slid along the wires to be seated the exit opening 174 and the covers 173 are attached to complete the assembly.

Figure 5:
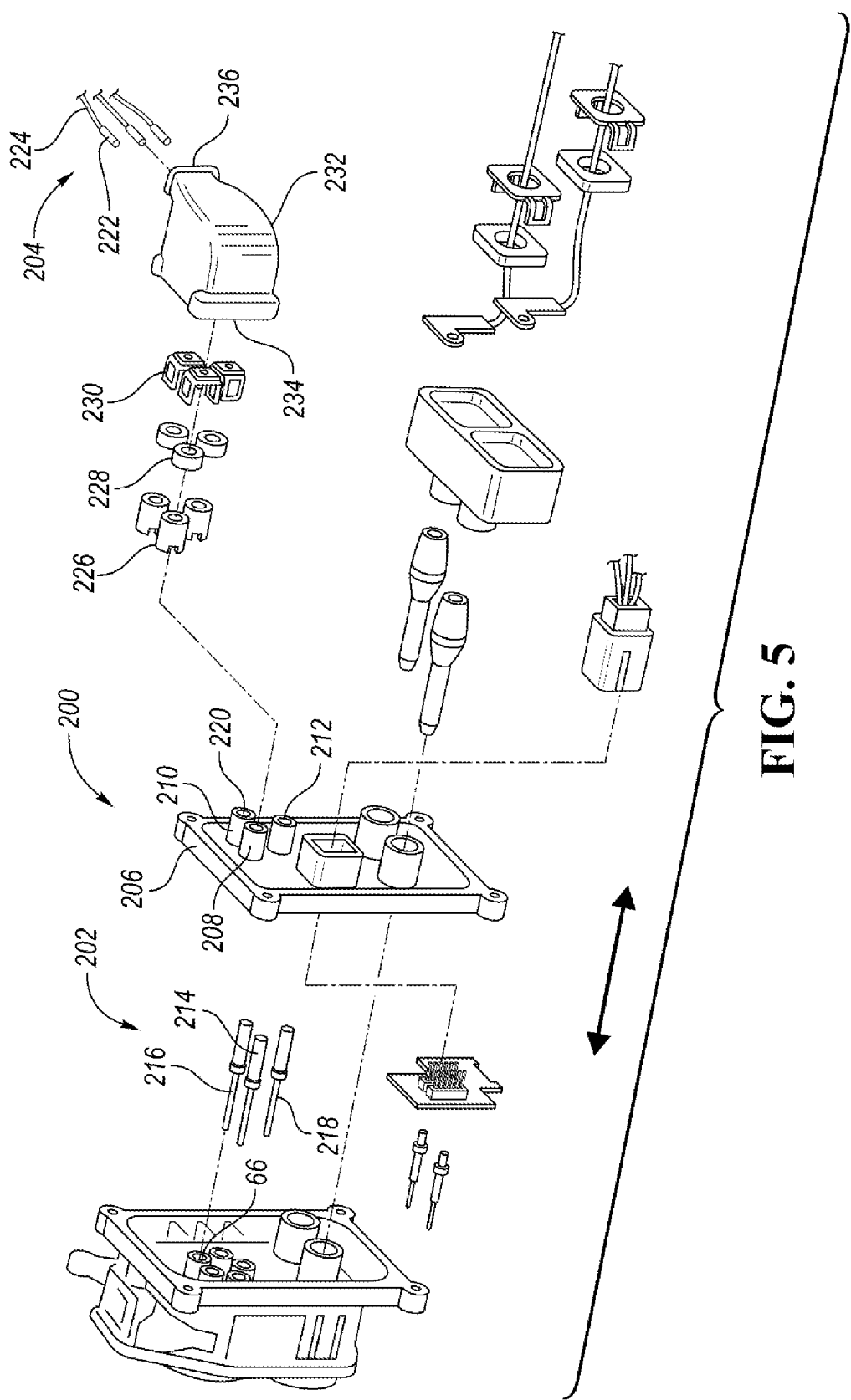
FIG. 5 is an exploded perspective view of another vehicle charge port assembly.

FIG. 5 illustrate another vehicle charge port assembly 200. For brevity, common components will not be discussed again. The assembly 200 includes a different connection between the AC pins and the wiring harness 204. In this embodiment, the rear cover 206 includes three sleeves 208, 210, and 212 for the AC line pin 214, the AC neutral pin 216, and the ground pin 218. The sleeves define holes 220 that receive the pins therethrough. The pins connect to connectors 222 of the wiring harness 204. The shown portion of the wiring harness 204 has three wires 224 associated with the AC and ground pins 214, 216, 218. Each wire 224 is threaded through a secondary lock 226, a wire seal 228, and a strain-relief clip 230. The locks 226 and the seals 228 are seated with the holes 220, and the clips 230 are disposed over the outer diameter of the sleeves. A cover 232 is disposed over the sleeves, the locks 226, the seals 228, and the wires 224. The cover 232 includes a front opening 234 and a rear opening 236.

The above described charge port assemblies provide a simplified assembly process that is more cost effective, easier to produce, and limits defects.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle charge port assembly comprising:
   a housing including a front side defining a port configured to couple to a charge-station coupler, a back side, and a plurality of terminal receptacles extending from the port to the back side;
   a plurality of terminal assemblies received in the terminal receptacles, each of the terminal assemblies including a pin having a tip portion configured to electrically connect to the coupler, a base portion, a busbar connected to the base portion and extending out of the back side, and a seal encircling the pin and sealingly disposed within the terminal receptacles;
   a back cover attached to the back side of the housing and including a connector base defining an opening and interior that receives the busbars therein; and
   a connector plug configured to connect to the connector base, the plug including a plurality of receptacles extendable into the interior and configured to receive the busbars therein, wires that are each joined to one of the receptacles, a plurality of seals each defining a single hole that receives only one of the wires therethrough, and a plurality of seal covers that each secure an associated one of the seals within the plug;
   a circuit board; and
   a plurality of second terminal assemblies received in the terminal receptacles and each including a pin having a tip portion configured to electrically connect to the charge station and a base portion connected to the circuit board, wherein the circuit board includes a plurality of prongs electrically connected to the second terminal assemblies, and the back cover further includes a second connector base that receives the prongs therein.

2. The vehicle charge port assembly of claim 1 further comprising:
   a second connector plug configured to connect to the second connector base and including receptacles configured to receive the prongs.

3. The vehicle charge port assembly of claim 1, wherein the pins include a line pin and a ground pin.

4. The vehicle charge port assembly of claim 3, wherein the pins further include another line pin.

5. The vehicle charge port assembly of claim 1, wherein the terminal assemblies are alternating-current (AC) terminal assemblies, and further comprising:
   direct-current (DC) terminal assemblies including pins disposed in the port, DC busbars connected to the pins, and DC wires attached to the DC busbars; and
   DC seals each defining a single hole that receives only one of the DC wires therethrough.

6. The vehicle charge port assembly of claim 5, wherein the back cover defines openings that receive the pins of the DC terminals.

* * * * *